US007782568B2

(12) United States Patent
Shiraki et al.

(10) Patent No.: US 7,782,568 B2
(45) Date of Patent: Aug. 24, 2010

(54) COMPACT THIN-FILM MAGNETIC HEAD AND MAGNETIC DISK DRIVE USING THE SAME

(75) Inventors: Kiyonori Shiraki, Kanagawa (JP); Masanori Tanabe, Kanagawa (JP); Masahiko Soga, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1229 days.

(21) Appl. No.: 11/351,771

(22) Filed: Feb. 10, 2006

(65) Prior Publication Data

US 2006/0181808 A1 Aug. 17, 2006

(30) Foreign Application Priority Data

Feb. 14, 2005 (JP) ............................. 2005-035706

(51) Int. Cl.
*G11B 5/60* (2006.01)
(52) U.S. Cl. ............. 360/234.5; 360/123.1; 360/123.36
(58) Field of Classification Search ............. 360/234.5, 360/234.3, 123.1, 123.36, 123.57
See application file for complete search history.

(56) References Cited

U.S. PATENT DOCUMENTS

| | | | |
|---|---|---|---|
| 5,001,591 A | 3/1991 | Nakashima | |
| 5,590,005 A * | 12/1996 | Tachibana | 360/234.5 |
| 5,894,380 A | 4/1999 | Sasada et al. | |
| 5,896,249 A * | 4/1999 | Fontana et al. | 360/234.5 |
| 6,256,170 B1 | 7/2001 | Honda | |
| 6,349,021 B1 * | 2/2002 | Honda | 360/317 |
| RE37,785 E | 7/2002 | Sasada et al. | |
| 6,487,044 B1 * | 11/2002 | Honda | 360/234.5 |
| 6,563,674 B1 * | 5/2003 | Honda | 360/234.5 |
| 7,102,855 B2 * | 9/2006 | Tabakovic et al. | 360/234.5 |
| 7,102,856 B2 * | 9/2006 | Koide et al. | 360/234.5 |
| 7,359,149 B2 * | 4/2008 | Kiyono et al. | 360/125.33 |
| 7,446,977 B2 * | 11/2008 | Nikitin et al. | 360/234.5 |
| 7,554,769 B2 * | 6/2009 | Yamakura et al. | 360/234.5 |
| 2004/0246623 A1 * | 12/2004 | Yazawa | 360/234.5 |
| 2006/0087770 A1 * | 4/2006 | Kato et al. | 360/234.5 |
| 2006/0181808 A1 * | 8/2006 | Shiraki et al. | 360/234.5 |
| 2007/0177305 A1 * | 8/2007 | Araki et al. | 360/234.5 |

(Continued)

FOREIGN PATENT DOCUMENTS

JP 10-064014 3/1998

(Continued)

*Primary Examiner*—Brian E Miller
(74) *Attorney, Agent, or Firm*—Townsend and Townsend and Crew; Rambod Nader

(57) ABSTRACT

Embodiments of the invention provide a compact thin-film magnetic head capable of being increased in the number of terminals, and a magnetic disk drive that uses the thin-film magnetic head. In one embodiment, a thin-film magnetic head is constructed that has a magnetic response element, multiple connection object terminals, multiple lead conductors electrically connected to the magnetic response element, and multiple connection sections each formed between each of the connection object terminals and one of the multiple lead conductors in order to electrically connect each of the connection object terminals and one of the lead conductor. All of the multiple lead conductors are provided in the state where they extend from the magnetic response element to the lower layers of the multiple connection object terminals. A magnetic disk drive using the thin-film magnetic head is constructed.

11 Claims, 4 Drawing Sheets

U.S. PATENT DOCUMENTS

2007/0201165 A1* 8/2007 Kato et al. ............... 360/234.5
2008/0088975 A1* 4/2008 Bennin et al. ............ 360/234.5

FOREIGN PATENT DOCUMENTS

| | | |
|---|---|---|
| JP | 10-149520 | 6/1998 |
| JP | 2597932 | 9/1998 |
| JP | 11-120515 | 4/1999 |
| JP | 2002-367133 | 12/2002 |
| JP | 2003-346308 | 12/2003 |

* cited by examiner

COMPACT THIN-FILM MAGNETIC HEAD AND MAGNETIC DISK DRIVE USING THE SAME

CROSS-REFERENCES TO RELATED APPLICATIONS

This application claims priority from Japanese Patent Application No. JP2005-035706, filed Feb. 14, 2005, the entire disclosure of which is incorporated herein by reference.

BACKGROUND OF THE INVENTION

The present invention relates to thin-film magnetic heads used in magnetic disk drives or the like, and more particularly, to size reduction of a thin-film magnetic head.

In magnetic disk drives such as hard-disk drives, the head slider equipped at a leading end of a magnetic head assembly is caused to fly above a magnetic disk to write information thereonto or read written information therefrom using a thin-film magnetic head formed at an edge of the head slider.

Some such types of thin-film magnetic heads each have: a coil for writing information onto the magnetic disk by converting, into a magnetic field, electrical signals associated with the information to be written; and a giant magnetoresistive (GMR) element for reading written information from the magnetic disk by reconverting into the original electrical signals the magnetic field generated according to the written information.

Such a thin-film magnetic head is manufactured using a thin-film forming process that includes such steps as shown in FIG. 4, for example. That is to say, a lower shield layer 210 is formed at an edge 200 of a head slider first (step A in FIG. 4). Next, after the formation of an insulating layer on the lower shield layer 210, a GMR element 211 and two lead electrode pieces, 220a, 220b, both for electrical connection to the GMR element 211, are further formed above the insulating layer (step B in FIG. 4).

Also, a first low-resistance lead layer 221a and a second low-resistance lead layer 221b are formed on the two lead electrode pieces, 220a, 220b, respectively (step C in FIG. 4) and then an insulating film is further formed on both of the two low-resistance lead layers, 221a, 221b.

At this time, electrical conducting holes 222a, 222b that penetrate the insulating films are formed in part of the two low-resistance lead layers 221a, 221b, respectively, by using a lift-off process (step D in FIG. 4). In addition, connection object selector pads 223a, 223b are formed over the two electrical conducting holes, 222a, 222b, respectively (step E in FIG. 4).

Furthermore, a first conductor 260a and second conductor 260b for establishing electrical continuity with respect to the low-resistance lead layers 221a, 221b, respectively, are formed above the connection object selector pads 223a, 223b, respectively (step G in FIG. 4). The first conductor 260a and the second conductor 260b are further insulated with alumina, an upper face of which is then exposed by chemical-mechanical polishing (CMP).

Next, first read wiring 270a with one end connected to the first conductor 260a and the other end extending to a forming position for a first read terminal 231a (see step J in FIG. 4), and second read wiring 270b with one end connected to the second conductor 260b and the other end extending to a forming position for a second read terminal 231b (also, see step J in FIG. 4), are formed in step H of FIG. 4. Thus, the first read terminal 231a and the first low-resistance lead layer 221a are selectively connected to each other and at the same time, the second read terminal 231b and the second low-resistance lead layer 221b are selectively connected to each other.

Meanwhile, an upper shield layer 212 is formed over the GMR element 211 (step E in FIG. 4) and a lower magnetic pole layer 213 is formed on the upper shield layer 212 (step F in FIG. 4).

Next, a first layer coil 214 is formed on the lower magnetic pole layer 213, and first write wiring 250a that extends from the first layer coil 214 to a forming position for a first write terminal 241a (see step J in FIG. 4) is formed (step G in FIG. 4). Additionally, a second layer coil 215 is formed and second write wiring 250b that extends from the second layer coil 215 to a forming position for a second write terminal 241b (see step J in FIG. 4) is formed (step H in FIG. 4).

Furthermore, an upper magnetic pole layer 216 covering the second coil layer 215 is formed (step I in FIG. 4), and the first read terminal 231a and second read terminal 231b respectively covering one end of each of the read wiring 270a and the read wiring 270b, and the first write terminal 241a and second write terminal 241b respectively covering one end of each of the write wiring 250a and the write wiring 250b, are formed via copper studs 230a, 230b, 240a, 240b (step J in FIG. 4). A thin-film magnetic head is thus manufactured.

In the thin-film magnetic head manufactured using such a process, the forming positions for the two conductors 260a, 260b that are to be formed above the two connection object selector pads 223a, 223b, the layout of the two sets of read wiring 270a, 270b and other factors are properly set to selectively connect each of the two read terminals 231a, 231b to either of the two low-resistance lead layers 221a, 221b (see Patent Reference 1 (Japanese Patent Laid-open No. 2002-367133), for example).

BRIEF SUMMARY OF THE INVENTION

For the conventional thin-film magnetic head described above, however, it has been necessary to reserve a special region for forming the connection object selector pads 223a, 223b, in addition to regions for forming the read terminals 231a, 231b, and the write terminals 241a, 241b.

Accordingly, when a heater or the like is to be provided to meet the need of multifunctional thin-film magnetic heads in recent years, terminals for supplying an electric current to the heater have been difficult to further provide in or on a compact thin-film magnetic head not having a sufficient available region at the head slider edge 200 shown in step J of FIG. 4.

The present invention has been made with the above problems in view, and a feature of the invention is to provide a compact thin-film magnetic head that allows the number of terminals to be increased, and a magnetic disk drive using the thin-film magnetic head.

A thin-film magnetic head according to an embodiment of the present invention for solving the above problems includes a magnetic response element, a plurality of terminals to be connected, a plurality of lead conductors each of which is to be electrically connected to the magnetic response element, and a plurality of connection sections each formed between each of the terminals to be connected and each of the plural lead conductors, and electrically connecting each of the terminals to be connected and each of the plural lead conductors; wherein all of the plural lead conductors are provided so as to extend from the magnetic response element to a lower layer of each terminal to be connected.

Also, the plural lead conductors may be formed so as not to intersect with one another or they may be formed in the same layer.

A magnetic disk drive according to another embodiment of the present invention for solving the above problems employs the above-described thin-film magnetic head.

A method of manufacturing a thin-film magnetic head for solving the above problems includes the steps of: forming a magnetic response element on a substrate; providing a plurality of lead conductors to be electrically connected to the magnetic response element, in such a manner that each of the lead conductors extends from the magnetic response element to a desired position; forming all of plural terminals to be connected, on an upper layer of each of the plural lead conductors; and forming, in a region where each of the plural terminals to be connected and one of the plural lead conductors are opposed to each other, connection sections that each establish electrical connection between each of the terminals to be connected and one of the plural lead conductors.

DETAILED DESCRIPTION OF THE INVENTION

Figure 1:
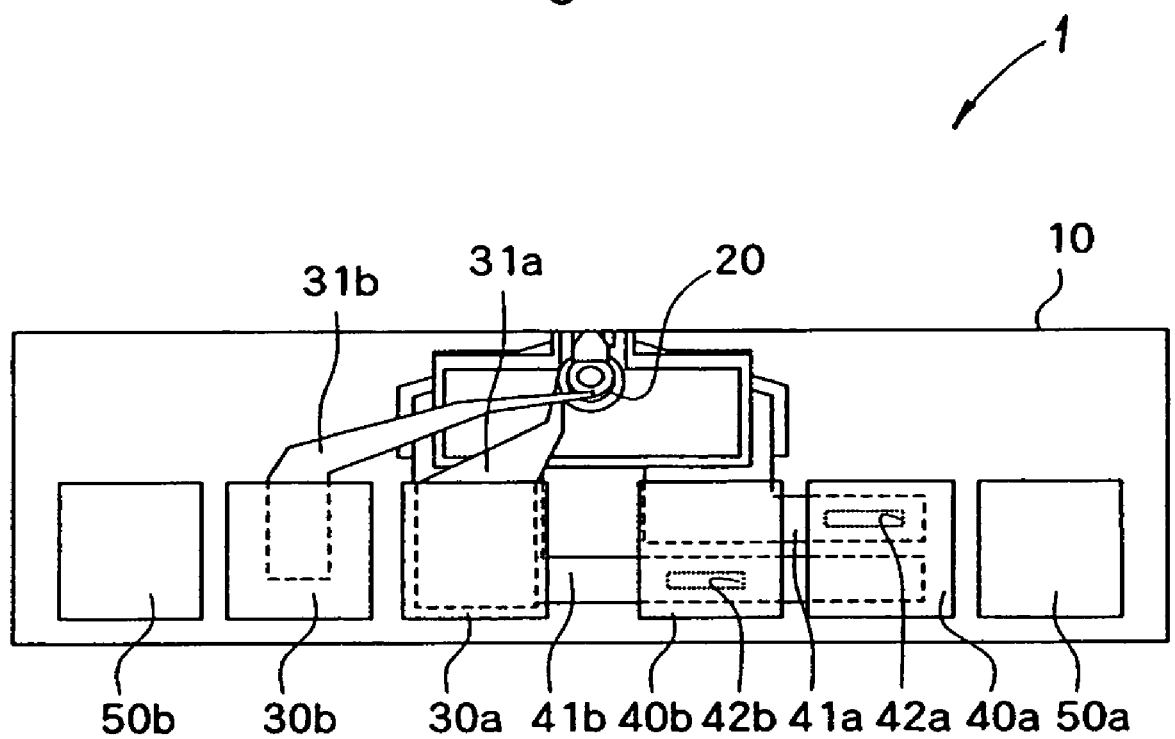
FIG. 1 is an explanatory diagram of a thin-film magnetic head according to an embodiment of the present invention.

A thin-film magnetic head according to an embodiment of the present invention, and a magnetic disk drive using the thin-film magnetic head, are described below referring to the accompanying drawings. An example of the thin-film magnetic head (hereinafter, referred to simply as the magnetic head 1) according to the present embodiment is shown in FIG. 1.

The magnetic head 1 is formed at one edge 10 of a slider head by use of a thin-film forming process. The magnetic head 1 has a coil 20 that generates a magnetic field by supplying an electric current in response to information to be written onto a magnetic disk. By using the thus-generated magnetic field, the magnetic head 1 magnetizes the magnetic disk and writes the information thereonto.

That is to say, the magnetic head 1 has a magnetic write head that includes a coil 20, a first write terminal 30a and a second write terminal 30b, both for supplying an electric current to the coil 20, and the first write wiring 31a and second write wiring 31b that electrically connect the coil 20 and the two write terminals, 30a, 30b.

The magnetic head 1 also has, in a layer well below the coil 20, a GMR element (not shown) for changing its own electrical resistance according to the magnetic field occurring on the magnetic disk, as a magnetic response element capable of converting the magnetic field into electrical signals according to the information written onto the magnetic disk. The magnetic head 1 reads the written information by acquiring changes in the electrical resistance of the GMR element as electrical signals.

That is to say, the magnetic head 1 further has a magnetic read head that includes a GMR element, a first read terminal 40a and a second read terminal 40b, both for supplying a sensing current to the GMR element, and the first lead conductor 41a and second lead conductor 41b that electrically connect the GMR element and the two read terminals, 40a, 40b.

In addition, the magnetic head 1 has two heater terminals 50a, 50b, used for a heater, in addition to the two write terminals 30a, 30b, and the two read terminals 40a, 40b. In short, the magnetic head 1 has six linearly arranged terminals approximately of the same size.

One of the factors characterizing the magnetic head 1 is that both of the two lead conductors 41a, 41b have their entire sections extended from the GMR element to a lower layer of each of the two read terminals 40a, 40b.

More specifically, the magnetic head 1 has the first lead conductor 41a and second lead conductor 41b formed so that they extend from the GMR element to the lower layer of the first read terminal 40a and that of the second read terminal 40b, respectively.

Part of each of the two lead conductors 41a, 41b formed below each of the two read terminals 40a, 40b, respectively, is formed with a sufficient area for forming one of the two connection sections 42a, 42b between each of the read terminals 40a, 40b. Hereinafter, such a part is called "intrusive section."

More specifically, the first lead conductor 41a and the second lead conductor 41b are both formed with an intrusive section of the size that allows not only the first connection section 42a to be formed between the first lead conductor 41a and the first read terminal 40a, but also the second connection section 42b to be formed between the second lead conductor 41b and the second read terminal 40b.

In the example of FIG. 1, the two lead conductors 41a, 41b each have an intrusive section, and in the lower layers of the two read terminals 40a, 40b adjacent to each other, both of the intrusive sections are formed in parallel to each other so as to get across a region in which the read terminals 40a, 40b are formed.

In addition, the magnetic head 1 has the two connection sections 42a, 42b that are formed between each of the two read terminals 40a, 40b and one of the two lead conductors 41a, 41b formed in the lower layer of each of the read terminals 40a, 40b, and electrically connect each of the read terminals 40a, 40b and one of the lead conductors 41a, 41b.

More specifically, the magnetic head 1 has the first connection section 42a formed between the first read terminal 40a and, of the two lead conductors 41a, 41b formed in the lower layer of the first read terminal 40a, only the first lead conductor 41a in order to selectively establish electrical continuity between the first read terminal 40a and the first lead conductor 41a. The magnetic head 1 further has the second connection section 42b formed between the second read terminal 40b and, of the two lead conductors 41a, 41b formed in the lower layer of the second read terminal 40b, only the second lead conductor 41b in order to selectively establish electrical continuity between the second read terminal 40b and the second lead conductor 41b.

The two connection sections 42a, 42b are each formed with an electrical conducting hole that penetrates an insulating film shielded by, for example, an upper face of the two lead conductors 41a, 41b, i.e., a face of the side opposed to the two read terminals 40a, 40b.

That is to say, the magnetic head 1 has, in the lower layer of each of the two read terminals, 40a, 40b, the two connection sections, 42a, 42b, that selectively connect each of the read terminals 40a, 40b, and one of the two mutually different lead conductors, 41a, 41b.

As described above, the magnetic head 1 has a connection object selector in the lower layer of each of the two read terminals 40*a*, 40*b*. The connection object selector includes: the two connection sections, 42*a*, 42*b*, for selecting, of the two lead conductors, 41*a*, 41*b*, pulled out from a GMR element, only the lead conductor for connection to each of the read terminals 40*a*, 40*b* to which the GMR element is to be connected; and part of each of the lead conductors 41*a*, 41*b* having the connection sections 42*a*, 42*b* formed respectively thereat.

In the example of FIG. 1, the above connection object selector is formed to selectively connect the first read terminal 40*a* and the first lead conductor 41*a* and to selectively connect the second read terminal 40*b* and the second lead conductor 41*b*. However, for example, when the first read terminal 40*a* and the second lead conductor 41*b* are to be selectively connected and the second read terminal 40*b* and the first lead conductor 41*a* are to be selectively connected, the connection object selector will be formed with two connection sections 42*a*, 42*b*, provided at positions different from those shown in FIG. 1.

That is to say, in this case, the magnetic head 1 will have a connection object selector that includes: a first connection section 42*a* formed between a first read terminal 40*a* and a second lead conductor 41*b* and having an electrical conducting hole for selectively establishing electrical continuity between the first read terminal 40*a* and the second lead conductor 41*b*; and a second connection section 42*b* formed between a second read terminal 40*b* and a first lead conductor 41*a* and having an electrical conducting hole for selectively establishing electrical continuity between the second read terminal 40*b* and the first lead conductor 41*a*.

As described above, the magnetic head 1 has, in a lower layer of each of the two read terminals 40*a*, 40*b*, a connection object selector for selecting, of the two lead conductors 41*a*, 41*b* pulled out from a GMR element, only the lead conductor for connection to each of the read terminals 40*a*, 40*b* to which the GMR element is to be connected. Accordingly, for example, the connection object selector pads 223*a*, 223*b* of the thin-film magnetic head, shown in FIG. 4, can be omitted.

In short, use of the magnetic head 1 makes it possible to provide a compact thin-film magnetic head that has, as shown in FIG. 1, two heater terminals 50*a*, 50*b* in addition to two read terminals 40*a*, 40*b* and two write terminals 30*a*, 30*b*.

Figure 2:
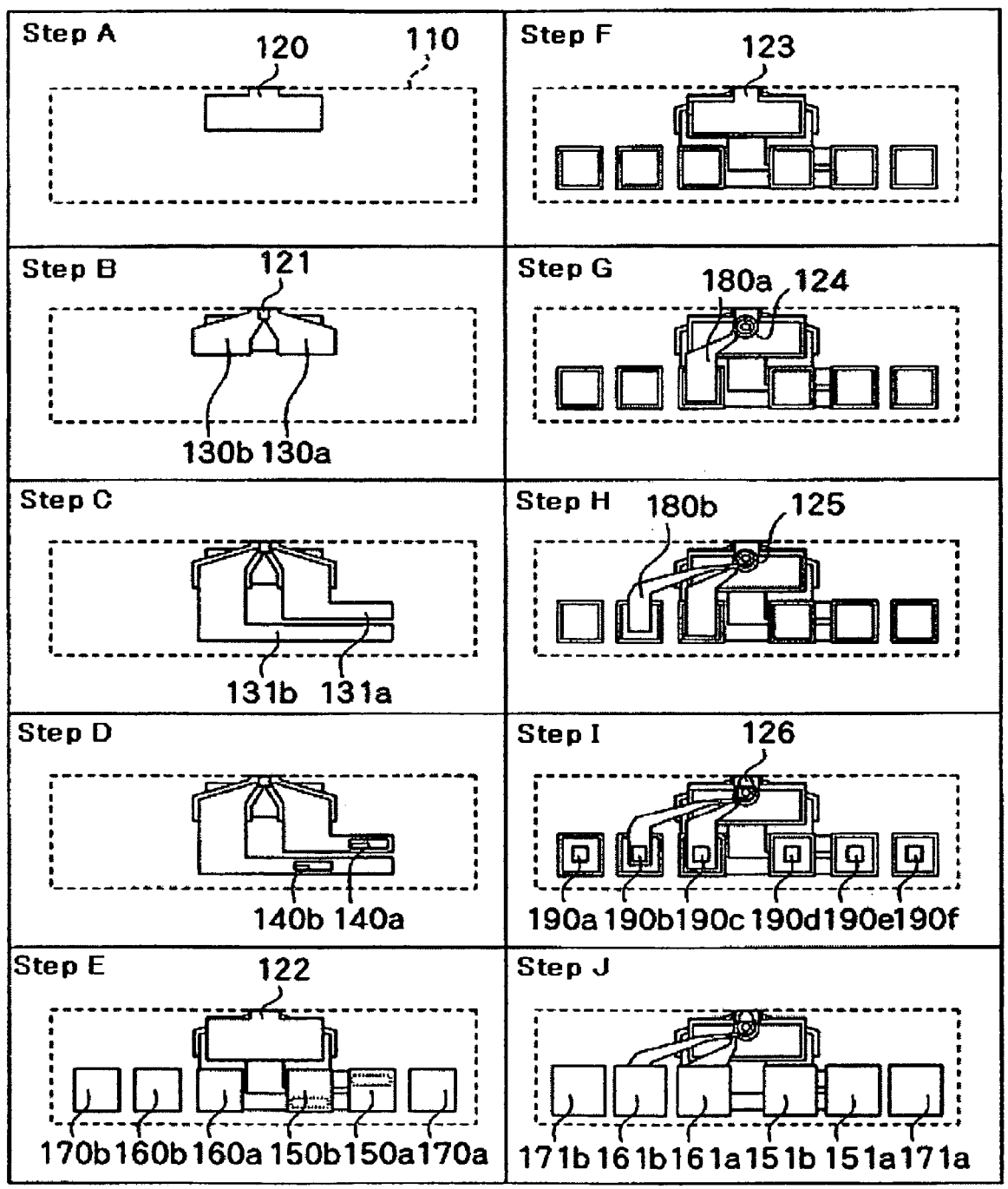
FIG. 2 is an explanatory diagram of the main manufacturing process steps for the thin-film magnetic head according to the above embodiment of the present invention.

Next, a method of manufacturing the magnetic head 1 is described hereunder. The main manufacturing processes for the magnetic head 1, based on a thin-film forming process that uses plating, deposition, sputtering, and the like are shown in FIG. 2. The manufacturing processes for the magnetic head 1, shown in FIG. 2, are divided into a process for forming a magnetic read head that uses a GMR element, and a process for stacking a coiled magnetic write head on the above-formed magnetic read head.

First, a description of the magnetic read head manufacturing process (process steps A to E in FIG. 2) is given below. During this magnetic read head manufacturing process, first in step A of FIG. 2, a lower shield layer 120 made of NiFe or the like is formed on a substrate made of the ceramic or like material that forms one edge 110 of a head slider. Also, an insulating film made of alumina or the like is further formed on the lower shield layer 120. A GMR element 121 is formed on the insulating film (step B in FIG. 2).

A first lead layer 130*a* and a second lead layer 130*b*, both made of TaW (or the like) and to be electrically connected to the GMR element 121, are formed across the GMR element 121 (step B in FIG. 2). Next, a first lead conductor 131*a* and a second lead conductor 131*b* are formed as low-resistance lead layers both made of Au or the like, on the first lead layer 130*a* and the second lead layer 130*b*, respectively.

In step C of FIG. 2, the two lead conductors, 131*a*, 131*b*, are each formed in the condition where they are pulled out from the GMR element 121 to regions in which will be formed a first read terminal 150*a* and second read terminal 150*b* to which the GMR element 121 is to be connected.

More specifically, the two lead conductors 131*a*, 131*b* are both formed across regions in which will be formed a connection object terminal group consisting of the two read terminals 150*a*, 150*b* to which the GMR element 121 is to be connected, i.e., in the region where the first read terminal 150*a* will be formed, the region where the second read terminal 150*b* will be formed, and a region including a region provided between the above two read terminals.

In other words, part of each of the two lead conductors 131*a*, 131*b* arranged in forming regions for the connection object terminal group is formed as an intrusive section below the first read terminal 150*a* and the second read terminal 150*b* (see step E in FIG. 2).

In this way, the two lead conductors 131*a*, 131*b* are formed in the same layer in parallel in order not to cross each other.

Next, an insulating film made of alumina or the like is formed on both of the lead conductors 131*a*, 131*b*. At this time, two connection sections 140*a*, 140*b* each for electrically connecting each of the lead conductors 131*a*, 131*b* and one of the two read terminals 150*a*, 150*b* are formed at the position where one of the two read terminals 150*a*, 150*b* connected to each of the lead conductors 131*a*, 131*b* will be formed, above the intrusive sections thereof. This process step is shown as D in FIG. 2.

More specifically, a first connection section 140*a* with the electrical conducting hole that penetrates the insulating film covering the first lead conductor 131*a* is formed at the position where the first read terminal 150*a* (see step E in FIG. 2) to be selectively connected to the first lead conductor 131*a* will be formed, at part of the intrusive section thereof. This process step is shown as D in FIG. 2.

Likewise, a second connection section 140*b* with the electrical conducting hole that penetrates the insulating film covering the second lead conductor 131*b* is formed at the position where the second read terminal 150*b* (see step E in FIG. 2) to be selectively connected to the second lead conductor 131*b* will be formed, at part of the intrusive section thereof. This process step is shown as D in FIG. 2.

Two mutually adjacent read terminal underlayers 150*a*, 150*b* that cover the two electrical conducting holes in the two connection sections 140*a*, 140*b* and are both made of NiFe or the like, are further formed on the two connection sections 140*a*, 140*b* (step E of FIG. 2).

Also, a first heater terminal underlayer 170*a* made of NiFe or the like is formed at a position adjacent to the first read terminal underlayer 150*a*, and a first write terminal underlayer 160*a* and second write terminal underlayer 160*b* that are adjacent to each other and both made of NiFe or the like, are formed at a position adjacent to the second read terminal underlayer 150*b* (step E of FIG. 2). Additionally, a second heater terminal underlayer 170*b* made of NiFe or the like is formed at a position adjacent to the second write terminal underlayer 160*b* (step E of FIG. 2).

Furthermore, an upper shield layer 122 made of NiFe or the like is formed on the GMR element 121 (step E in FIG. 2). The upper shield layer 122 is formed in the same layer as the read terminal underlayer 150*a*, 150*b*. The magnetic read head section of the magnetic head 1 is formed by the magnetic read head manufacturing process described above.

Next, a description of a magnetic write head manufacturing process (process steps F to I in FIG. 2) is given below. In this magnetic write head manufacturing process, a lower magnetic pole layer 123 made of an NiFe alloy or the like is formed on an upper shield layer 122 first (step F of FIG. 4).

Next, a first layer coil 124 made of Cu or the like is formed on the lower magnetic pole layer 123 (step G in FIG. 2), and first wiring 180a for electrically connecting the first layer coil 124 and the first write terminal underlayer 160a is further formed (step G in FIG. 2).

In step H of FIG. 2, a second layer coil 125 made of Cu or the like is formed on the first layer coil 124, and second wiring 180b for electrically connecting the second layer coil 125 and the second write terminal underlayer 160b is further formed.

Furthermore, an upper magnetic pole layer 126 made of an NiFe alloy or the like is formed on the second layer coil 125 (step I in FIG. 2). The magnetic write head section of the magnetic head 1 is formed in a stacked condition on the magnetic read head section by the magnetic write head manufacturing process described above.

Finally, a thin film made of gold or the like is formed on each of the read terminal underlayers 150a, 150b, write terminal underlayers 160a, 160b, and heater terminal underlayers 170a, 170b, via a copper stud 190a, 190b, 190c, 190d, 190e, 190f. This results in the formation of the magnetic head 1 having the two read terminals 151a, 151b, two write terminals 161a, 161b, and two heater terminals 171a, 171b, as shown in step J of FIG. 4.

One of the factors characterizing the magnetic head 1 is that in a relatively early (upstream) process step of such thin-film forming multiprocess steps as shown in FIG. 2, characteristics of the GMR element 121 formed in the magnetic head 1 can be evaluated at the two read terminals 151a, 151b.

More specifically, in the manufacturing process for the magnetic head 1 using the GMR element 121, it is necessary to evaluate whether the characteristics (such as electrical resistance) of the formed GMR element 121 are sufficient to such an extent that it can read the information written onto the magnetic disk. After the evaluation, a product with a formed GMR element 121 not satisfying performance standards is rejected as a defective product.

Figure 4:
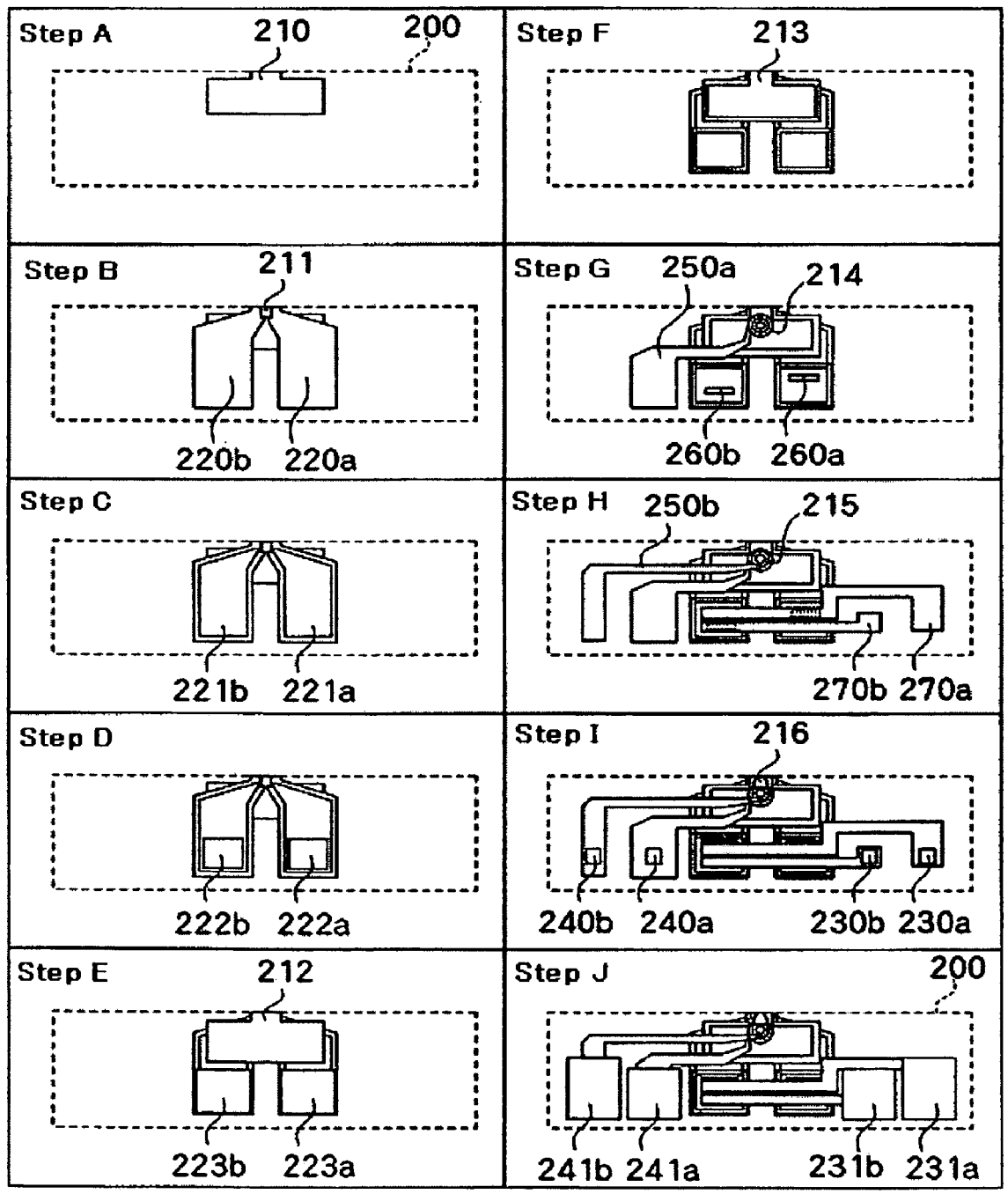
FIG. 4 is an explanatory diagram showing an example of the main manufacturing process steps for a conventional thin-film magnetic disk.

In this context, the characteristics of the GMR element 211 manufactured using, for example, the conventional thin-film magnetic head manufacturing process shown in FIG. 4 have not been estimable in up to process step J thereof. Accordingly, since the characteristics of the GMR element 211 have not been estimable in up to a downstream process step of the conventional manufacturing process for thin-film magnetic heads, processing through a number of unnecessary process steps has been provided for defective products.

During such a manufacturing process for the magnetic head 1 as shown in FIG. 2, however, connections between the GMR element 121 and the two read terminal underlayers 150a, 150b to which the GMR element 121 is to be connected, are formed in, for example, the magnetic read head manufacturing process step E of FIG. 2. For this reason, the characteristics of the formed GMR element 121 can be estimated in an early process step of the manufacturing process for the magnetic head 1. During the manufacture of the magnetic head 1, therefore, since a product with a formed GMR element 121 not satisfying performance standards is rejected early in an upstream process step, it is possible to omit subsequent unnecessary process steps for defective products and thus to improve manufacturing efficiency of products.

Next, an example of a magnetic disk drive (hereinafter, called the drive 2) using the magnetic head 1 is described below. The drive 2 has a magnetic disk (not shown) that is rotatably retained, and a magnetic head assembly equipped with a head slider at which the magnetic head 1 is formed.

Figure 3:
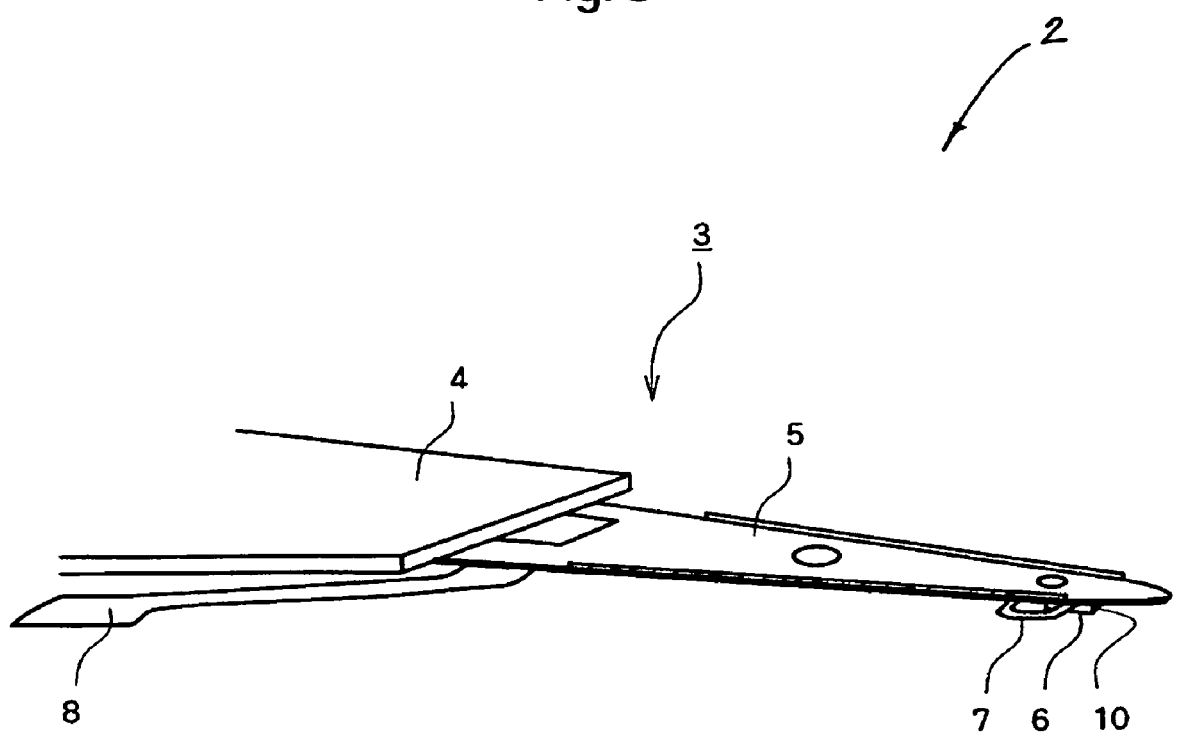
FIG. 3 is an explanatory diagram of a magnetic head assembly of a magnetic disk drive according to another embodiment of the present invention.

A magnetic head assembly 3 of the drive 2 is shown by way of example in FIG. 3. As shown therein, the magnetic head assembly 3 has an arm 4 rotatably supported by a pivot, a spring 5 fixed to the arm 4, and a flexure 7 secured to the spring 5 and having, at a front end, a head slider 6 with the formed magnetic head 1.

The magnetic head 1 is formed at an edge 10 of the head slider 6. As shown in FIG. 1, the magnetic head 1 has two write terminals 30a, 30b, two read terminals 40a, 40b, and two heater terminals 50a, 50b. These six terminals are electrically connected by soldering or the like to six respective wiring patterns (not shown) formed on the flexure 7. These wiring patterns are further electrically connected to a control circuit (not shown) via a relay connector 8 fixed to the arm 4, the control circuit functioning to control information writing onto or reading from the magnetic disk by the magnetic head 1. That is to say, the terminals of the magnetic head 1 are electrically connected to the control circuit via the wiring patterns.

The drive 2 makes the head slider 6 of the magnetic head assembly 3 fly above the magnetic disk in rotation, supplies an electric current from the control circuit via the wiring patterns to a coil 20 according to information to be written onto the magnetic disk, and magnetizes the magnetic disk by using a magnetic field generated between upper and lower magnetic pole layers (see steps F and I in FIG. 2) of the coil 20. The information is thus written onto the magnetic disk.

Also, the drive 2 reads the written information from the magnetic disk by making the head slider 6 of the magnetic head assembly 3 fly above the rotating magnetic disk, supplying a sensing current from the control circuit via the wiring patterns to a GMR element, and detecting changes in electrical resistance of the GMR element according to the intensity of the magnetic field generated on the magnetic disk having the written information.

In addition, the drive 2 supplies an electric current from the control circuit via the wiring patterns to two heater terminals 50a, 50b, thus heating a heater.

A configuration of the thin-film magnetic head according to the present invention, and a configuration of the magnetic disk drive using the thin-film magnetic head, are not limited to the embodiments described above.

While a configuration using a CIP (Current In Plane) type of GMR element as an example of a magnetic response element has been described in the present embodiment, this magnetic response element is not limited to the description and may be of any type capable of converting into electrical signals the magnetic field generated on the magnetic disk according to the information written thereonto. For example, a CPP (Current Perpendicular to Plane) type of GMR element, a CIP type or CPP type of tunneling magnetoresistive (TMR) element, or the like can be used.

Additionally, while a magnetic head 1 having a connection object selector for selecting which of the two lead conductors 41a, 41b is to be connected to which of the two read terminals 40a, 40b has been described in the present embodiment, the type of magnetic head 1 is not limited to the description and the magnetic head may have a connection object selector capable of selecting connection objects between a set of three or more lead conductors and that of three or more read terminals. In this case, the magnetic head 1 will have at least three conductors formed in a lower layer of each terminal, and a connection object selector for selecting which of the three or more terminals is to be connected to which of the three or more conductors.

Furthermore, while an example of a magnetic head 1 having heater terminals in addition to write terminals and read terminals has been described in the present embodiment, the type of magnetic head 1 is not limited to the example and the magnetic head may employ terminals intended for other purposes.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A thin-film magnetic head, comprising:
   a magnetic response element;
   a plurality of terminals to be connected;
   a plurality of lead conductors each of which is to be electrically connected to said magnetic response element; and
   a plurality of connection sections, where each of said plurality of connections is formed between each of said terminals to be connected and one of said plurality of lead conductors, each of said connection sections establishing electrical connection between each of said terminals to be connected and one of said lead conductors;
   wherein all of said plurality of lead conductors are provided so as to extend from said magnetic response element to a lower layer of each of said terminals to be connected.

2. The thin-film magnetic head according to claim 1, wherein said plurality of lead conductors do not cross one another.

3. The thin-film magnetic head according to claim 1, wherein said plurality of lead conductors are formed in the same layer.

4. The thin-film magnetic head according to claim 1, wherein said plurality of lead conductors include a first lead conductor and a second lead conductor, and wherein said plurality of connection sections include a first connection section and a second connection section.

5. The thin-film magnetic head according to claim 4,
   wherein said plurality of terminals include a first read terminal and a second read terminal, and
   wherein part of each of the first and second lead conductors is formed below each of the first and second read terminals, respectively, and is formed with a sufficient area for forming one of the first and second connection sections between each of the first and second read terminals.

6. The thin-film magnetic head according to claim 5, wherein the first lead conductor and the second lead conductor are formed each with a first intrusive section of a size that allows the first connection section to be formed between the first lead conductor and the first read terminal, and the second connection section to be formed between the second lead conductor and the second lead terminal.

7. The thin-film magnetic head according to claim 5,
   wherein the first connection section is formed between the first read terminal and the first lead conductor to selectively establish electrical continuity between the first read terminal and the first lead conductor; and
   wherein the second connection section is formed between the second read terminal and the second lead conductor to selectively establish electrical continuity between the second read terminal and the second lead conductor.

8. The thin-film magnetic head according to claim 5, wherein a connection object selector is formed including
   the first and second connection sections, wherein each of the first and second connection sections is selectively connected to each of the respective first and second read terminals to which the magnetic response element is to be connected; and
   part of each of the first and second lead conductors having the first and second connection sections formed respectively thereat.

9. The thin-film magnetic head according to claim 5, wherein a connection object selector is formed including:
   the first connection section formed between the first read terminal and the second lead conductor and having a first electrical conducting hole for selectively establishing electrical continuity between the first read terminal and the second lead conductor; and
   the second connection section formed between the second read terminal and the first lead conductor and having a second electrical conducting hole for selectively establishing electrical continuity between the second read terminal and the first lead conductor.

10. The thin-film magnetic head according to claim 1, wherein said plurality of terminals include read terminals, write terminals, and heater terminals.

11. A magnetic disk drive comprising:
    a thin-film magnetic head, wherein the thin film magnetic head comprises:
    a magnetic response element;
    a plurality of terminals to be connected;
    a plurality of lead conductors each of which is to be electrically connected to said magnetic response element; and
    a plurality of connection sections, where each of said plurality of connections is formed between each of said terminals to be connected and one of said plurality of lead conductors, each of said connection sections establishing electrical connection between each of said terminals to be connected and one of said lead conductors;
    wherein all of said plurality of lead conductors are provided so as to extend from said magnetic response element to a lower layer of each of said terminals to be connected.

* * * * *